US010133761B2

(12) United States Patent
Jarvis (10) Patent No.: US 10,133,761 B2
(45) Date of Patent: Nov. 20, 2018

(54) METADUMP SPATIAL DATABASE SYSTEM (71) Applicant: Quantum Corporation, San Jose, CA (US)

(72) Inventor: Ben Jarvis, Mendota Heights, MN (US)

(73) Assignee: Quantum Corporation, San Jose, CA (US)

( * ) Notice: Subject to any disclaimer, the term of this patent is extended or adjusted under 35 U.S.C. 154(b) by 226 days.

(21) Appl. No.: 14/956,553

(22) Filed: Dec. 2, 2015

(65) Prior Publication Data

US 2017/0161308 A1 Jun. 8, 2017

(51) Int. Cl.
*G06F 17/30* (2006.01)

(52) U.S. Cl.
CPC .. *G06F 17/30324* (2013.01); *G06F 17/30174* (2013.01); *G06F 17/30327* (2013.01)

(58) Field of Classification Search
CPC .................................................. G06F 17/30324
See application file for complete search history.

(56) References Cited

U.S. PATENT DOCUMENTS

| 8,572,048 | B2 * | 10/2013 | LaBerge | G06F 17/30227 |
| | | | | 707/684 |
| 9,767,106 | B1 * | 9/2017 | Duggal | G06F 17/30088 |
| 2003/0158661 | A1 * | 8/2003 | Chen | G06T 17/05 |
| | | | | 701/532 |
| 2003/0182301 | A1 * | 9/2003 | Patterson | G06F 11/1458 |
| 2004/0036688 | A1 * | 2/2004 | Cutlip | G06T 17/05 |
| | | | | 345/440 |
| 2007/0027940 | A1 * | 2/2007 | Lutz | G06F 3/0605 |
| 2008/0021914 | A1 * | 1/2008 | Davies | G06F 17/30315 |
| 2009/0063453 | A1 * | 3/2009 | Adler | G06F 17/30241 |
| 2009/0187464 | A1 * | 7/2009 | Bai | G06Q 10/04 |
| | | | | 705/7.34 |
| 2010/0049930 | A1 * | 2/2010 | Pershin | G06F 11/1451 |
| | | | | 711/162 |
| 2010/0179959 | A1 * | 7/2010 | Shoens | G06F 17/30088 |
| | | | | 707/758 |
| 2010/0228130 | A1 * | 9/2010 | Chiang | A61B 8/546 |
| | | | | 600/447 |
| 2011/0066617 | A1 * | 3/2011 | Liu | G06F 17/30389 |
| | | | | 707/737 |
| 2012/0317079 | A1 * | 12/2012 | Shoens | G06F 17/30215 |
| | | | | 707/639 |
| 2013/0268493 | A1 * | 10/2013 | Berman | G06F 11/1451 |
| | | | | 707/649 |

(Continued)

*Primary Examiner* — Syed H Hasan
(74) *Attorney, Agent, or Firm* — Eschweiler & Potashnik, LLC (57) ABSTRACT Example apparatus and methods create and maintain a functional mirror of file system metadata for an active file system. The functional mirror may be implemented as a set of feature vectors in a feature space stored in a spatial database that allow a journal functionality for information received from the active file system. Mirror creation and maintenance can operate in parallel. The functional mirror may be created primarily using a systematic, system-wide, multi-threaded crawler approach whose results are updated using an event-driven approach that accounts for changes that may obsolete information acquired during the crawler approach. Transaction identifiers may be stored and potentially obsolete information preserved to facilitate providing views and rewind features.

31 Claims, 9 Drawing Sheets

(56) References Cited

U.S. PATENT DOCUMENTS

| | | | |
|---|---|---|---|
| 2013/0311429 A1* | 11/2013 | Agetsuma | G06F 11/1451 |
| | | | 707/640 |
| 2014/0019413 A1* | 1/2014 | Braam | G06F 11/1471 |
| | | | 707/625 |
| 2014/0074787 A1* | 3/2014 | Berman | G06F 11/1451 |
| | | | 707/639 |
| 2014/0156610 A1* | 6/2014 | Akers | G06F 17/30135 |
| | | | 707/693 |
| 2014/0330787 A1* | 11/2014 | Modukuri | G06F 11/20 |
| | | | 707/659 |
| 2015/0074064 A1* | 3/2015 | Goldberg | G06F 17/30156 |
| | | | 707/692 |
| 2015/0112939 A1* | 4/2015 | Cantwell | G06F 11/1451 |
| | | | 707/646 |
| 2015/0127619 A1* | 5/2015 | Jarvis | G06F 11/1458 |
| | | | 707/685 |
| 2016/0041778 A1* | 2/2016 | Li | G06F 3/061 |
| | | | 711/114 |

* cited by examiner

METADUMP SPATIAL DATABASE SYSTEM

BACKGROUND

File systems store files and store information about files. The information stored in files may be referred to as data. The information about files may be referred to as metadata. The metadata may include, for example, a file name, a file size, a file parent, a file descendant, a file access time, a file owner, file permissions, and other information. Some of the metadata for an individual file may be stored in a data structure known as an inode. The inodes and metadata for a file system may also be stored collectively. The metadata has both structure and content. The content (e.g., metadata) may be stored in a set of data structures (e.g., btrees). When the metadata is stored in one or more trees (e.g., btrees), there may be a root inode associated with the top of the set of trees. When the data in a file or about a file changes, a file system may want to update the metadata about that file. For example, if the contents of a file are changed, the file system may want to memorialize the time at which the change was made and by whom the change was made.

To protect the metadata concerning the files organized and made available by a file system the file system may include a metadata dump facility that contains a mirror of the file system metadata. The metadata dump may be referred to as a metadump. The file system may seek to keep the metadump updated in real time as the metadata changes in the file system. The metadump may be intended to facilitate, for example, accelerated disaster recovery. In the event of a disaster, the metadump can be used to restore metadata in a wholesale manner for the file system it mirrors. Restoring the metadata may include rebuilding the structure(s) in which the metadata was stored and then populating those structure(s).

Conventionally, the metadump for a file system may have been stored in a structured query language (SQL) database that contained a copy of the file system metadata. When a file system transaction occurred in the file system, a copy of the modified metadata was sent to the SQL database and applied. In effect, the metadata database was a mirror of the file system metadata, but in SQL form. Capturing backups as well as restoring backups was performed without file system down time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods concern preserving the structure and contents of metadata associated with a file system. Example apparatus and methods can preserve metadata for the file system using a spatial database system instead of a conventional relational (e.g., SQL) database. Recall that in a previous metadump service embodiment, the metadump for a file system may have been stored in a structured query language (SQL) database that contained a copy of the file system metadata. When a file system transaction occurred in the file system, a copy of the modified metadata was sent to the SQL database and applied. In effect, the metadata database was a mirror of the file system metadata, but in SQL form. Capturing backups as well as restoring backups was performed without file system down time. While the SQL database provided new functionality, example apparatus and methods may provide additional new functionalities and may improve the efficiency of a computer running a metadump service by employing a spatial database.

Figure 1:
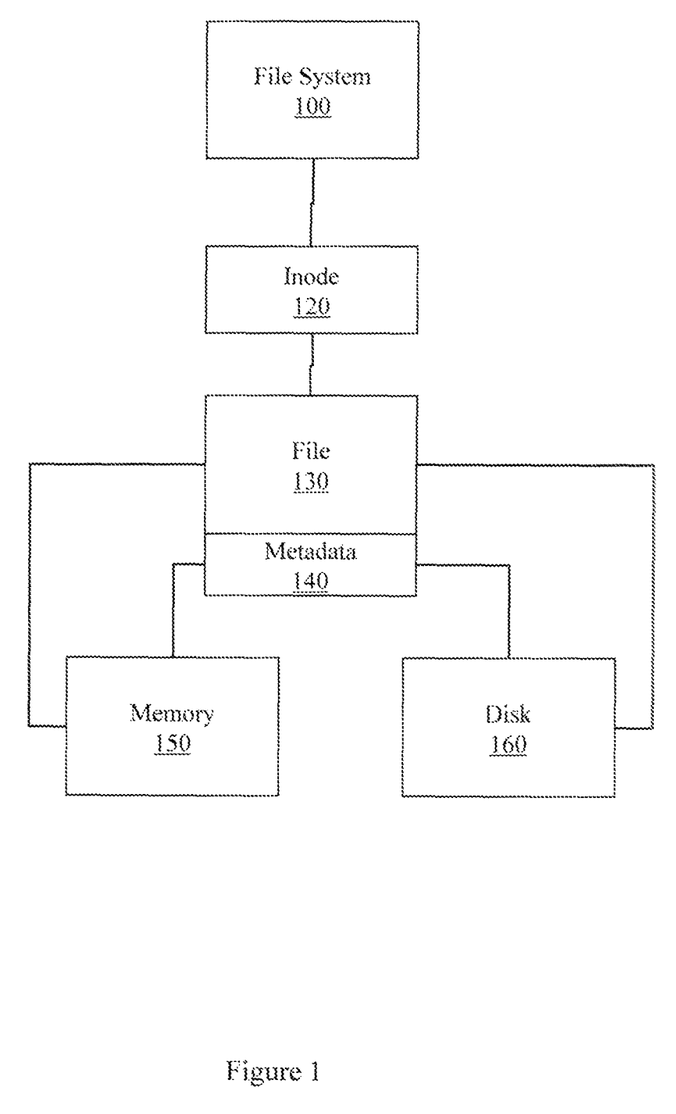
FIG. 1 illustrates a file system.

FIG. 1 illustrates a file system 100. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. In between the time when the updates are made and the updates are stored to permanent storage (e.g., disk), which is the time while there are changes that have been made only in memory 150, a journal may be used to protect those changes. In one embodiment, some of the metadata 140 for a file 130 may be stored in the inode 120 associated with the file. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. Example apparatus and methods capture and restore both the structure of the metadata and the contents of the metadata using a spatial database.

Figure 2:
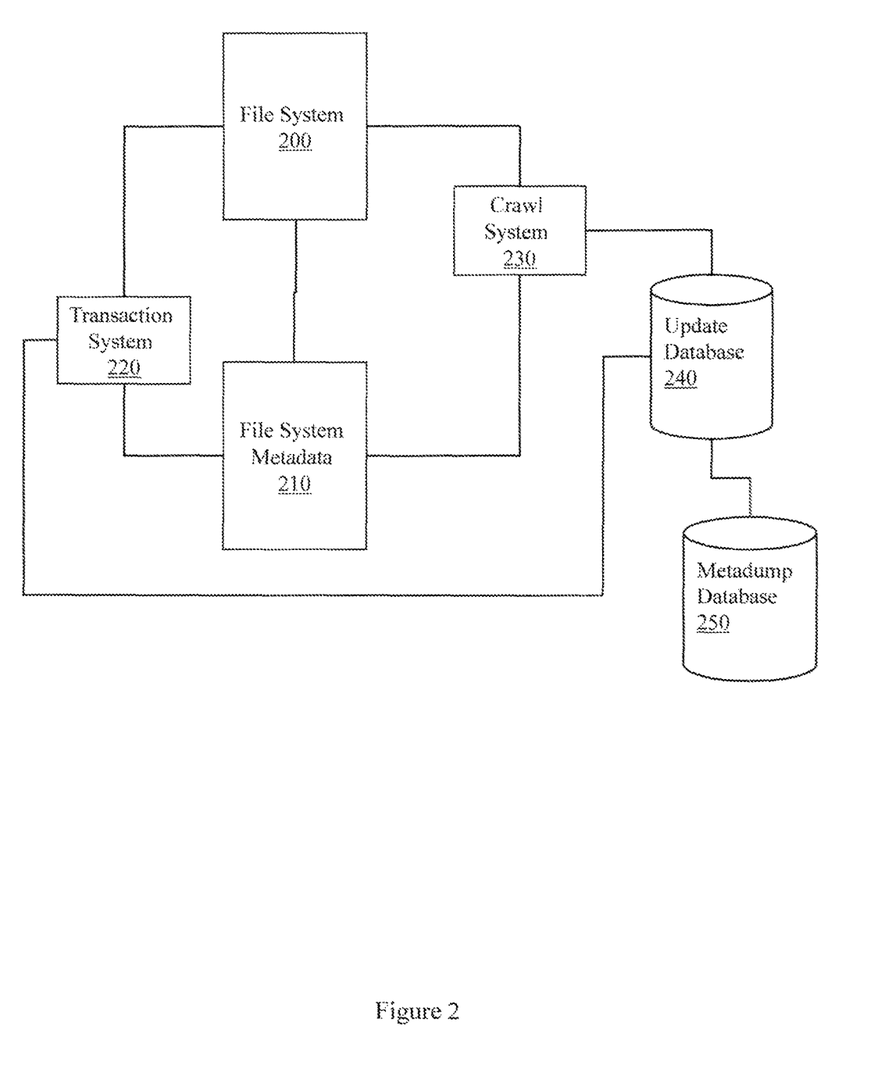
FIG. 2 illustrates an example file system metadata capture system.

FIG. 2 illustrates an example file system metadata capture system. A file system 200 has file system metadata 210. In one embodiment, a mirror of the file system metadata 210 is stored in metadump database 250. Rather than write an exact mirror of the file system metadata 210 to metadump database 250, which would require stopping file system 200 while the metadata 210 was scanned, example systems take a two process and two stage approach. A crawl system 230 systematically moves through the file system 200 or file system metadata 210 to locate and analyze files or inodes. The crawl system 230 may use different approaches including, for example, a depth-first tree walk, a breadth-first search, a combination of searches, or other approaches. The crawl system 230 may identify inodes that are parent inodes and spawn additional threads to search the descendants of the parent. The additional threads may operate in parallel. The crawl system 230 may populate an update database 240 with information discovered in the file system 200 or metadata 210. The crawl system can work while the file system 200 is still operating because changes made to an inode after the crawl system 230 has reported on the inode may be caught by transaction system 220. While a separate metadump database 250 is described, in one embodiment, a file system may effectively be the data storage for a file system itself.

Transaction system 220 posts changes to the file system 200 or metadata 210 to the update database 240. The transaction system 220 operates at least partially in parallel with the crawl system 230 and operates while the file system 200 is active. Thus, update database 240 receives both crawler information and transactional information, which facilitates creating and maintaining an up-to-date mirror of the file system metadata 210 in metadump database 250. The transaction system 220 may batch up a number (e.g., hundred, thousand, hundred thousand) of transactions before posting the transactions to the update database 240. The update database 240 may therefore be able to collapse, manipulate, or otherwise optimize transactions before posting them to metadump database 250. For example, the update database 240 may perform peephole optimization on the batch of transactions or other transactions collected in update database 240. Using the two stage process where information first goes to the update database 240 and then is selectively posted to the metadump database 250 facilitates decoupling file system journaling from the application of metadump updates, which can remove a file system bottleneck found in conventional one-stage, tightly-coupled systems.

Figure 3:
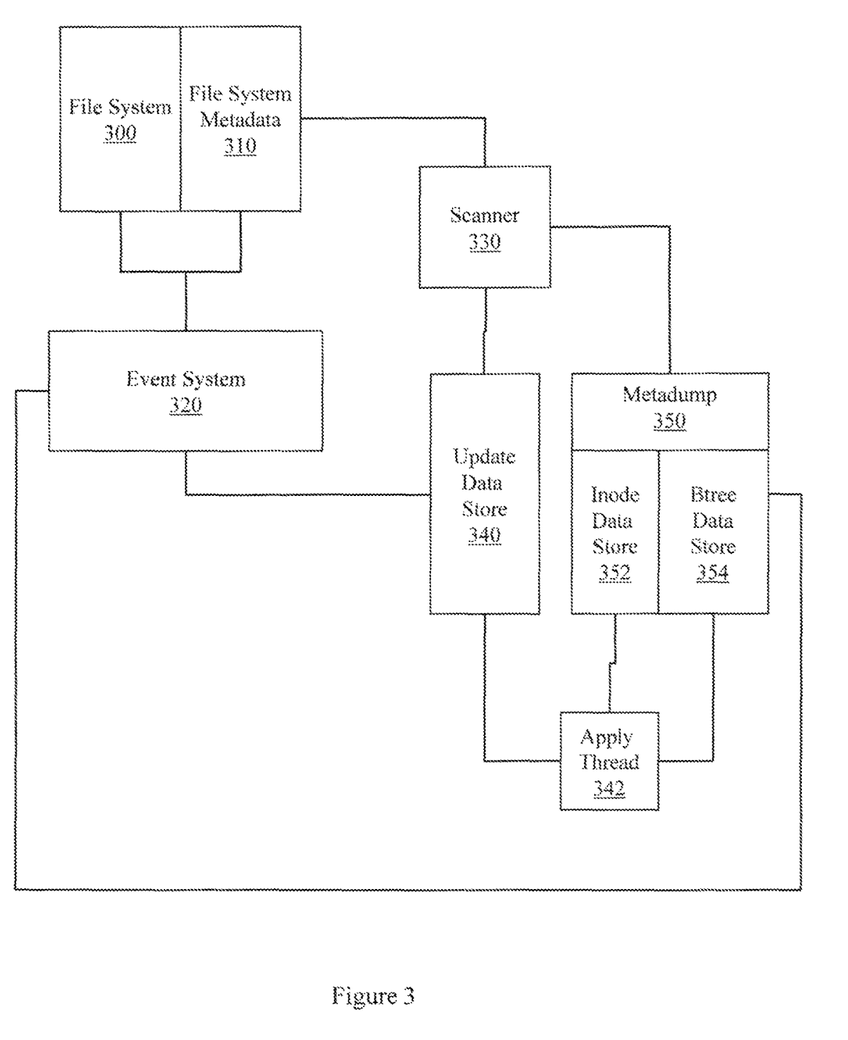
FIG. 3 illustrates an example file system metadata capture and restore system.

FIG. 3 illustrates an example file system metadata capture and restore system. In this embodiment, file system 300 and file system metadata 310 interact with a single scanner 330 and a single event system 320. The scanner 330 may be multi-threaded and may provide both inbound (e.g., create/maintain) services and outbound (e.g., restore) services. The event system 320 may also be multi-threaded and may also provide both inbound and outbound services.

The metadata 310 is stored in a metadump 350 that may include multiple database data stores. For example, the metadump 350 may include an inode data store 352 that stores information about the structure of file system 300 including its inodes and their relationships. In one embodiment, the file system 300 or the file system metadata 310 may be organized as a set of trees (e.g., btrees). Therefore, the metadump 350 may also include a btree data store 354 that stores data from the set of trees. In one embodiment, the metadump 350 may be a spatial database and the inode data store 352 and the btree data store 354 may be data stores in the spatial database.

The scanner 330 and event system 320 may populate an update data store 340 during inbound processing (e.g., create/maintain) and may retrieve information from the metadump 350 during output processing (e.g., restore). Data may be selectively moved from the update data store 340 to the inode data store 352 or the btree data store 354 by an apply thread 342. The apply thread 342 may perform optimizations (e.g., peephole optimization). "Peephole optimization" refers to analyzing a set of transactions to identify transactions that can be removed due, for example, to later superseding transactions. For example, a file may be "touched" a hundred times in a row without changing any of the contents of the file. However, each touch may change the access time for the file and create a separate file system transaction. Peephole optimization may recognize the hundred touches and realize that only the last touch is relevant and therefore remove the transactions associated with the previous ninety-nine touches. Other such optimizations may also be applied. The apply thread 342 may also be selectively paused to allow the metadump 350 to quiesce before, for example, a backup operation.

In one embodiment, writes from the scanner 330 or event system 320 may be asynchronous writes that need to be completed before the data associated with the write is removed from the scanner or event system 320. Similarly, in one embodiment, writes from the apply thread 342 may be asynchronous writes that need to be completed before the data associated with the write is removed. In one embodiment, when the update data store 340, inode data store 352, and btree data store 354 are spatial database data store, writes to the data stores may use a write-ahead log approach.

The inode data store 352 and the btree data store 354 may store information sufficient for restoring file system metadata 310. While inode data store 352 and btree data store 354 provide a mirror of file system metadata 310, the data stores may not be constrained to share the exact format of the structures or hierarchy in file system metadata 310. For example, hierarchical structures or trees in file system metadata 310 may be flattened into structures that preserve the metadata information without being constrained by the metadata organization.

Figure 4:
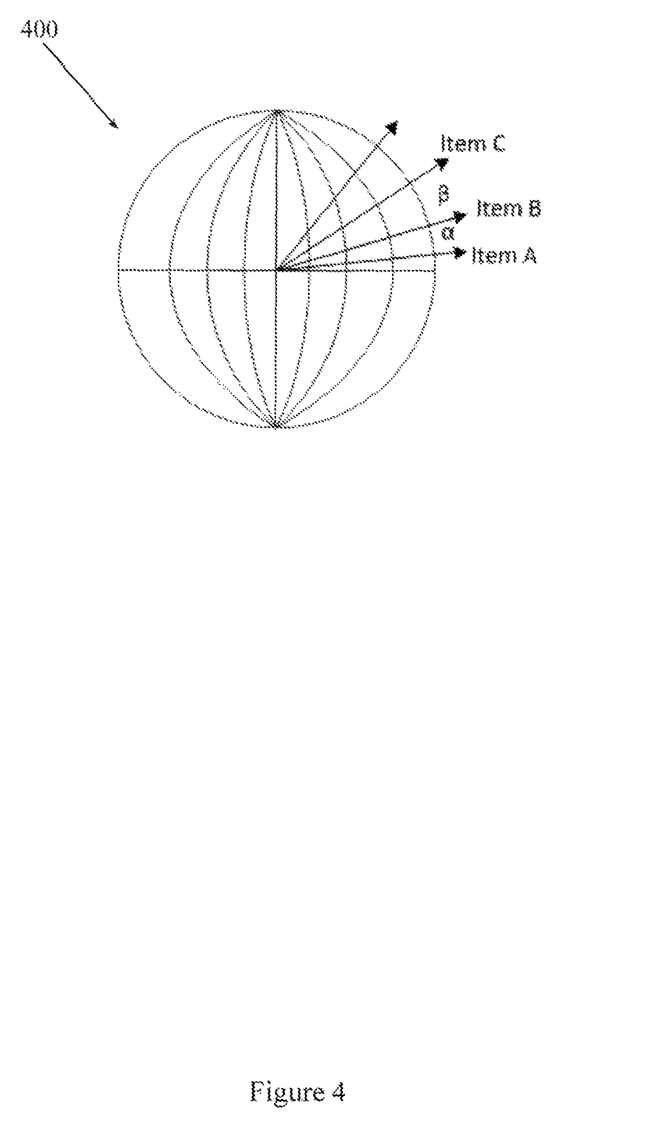
FIG. 4 illustrates example feature vectors associated with an example metadump spatial database system.

FIG. 4 illustrates feature vectors associated with a spatial database used for a metadump. A spatial database is organized and optimized to store and query data that represents objects that are defined in a geometric space. The concept of Cartesian co-ordinates (e.g., x,y) on a map or graph is familiar. Cartesian co-ordinates are one example of how a location or information can be represented in two dimensions. A vector that starts at the origin of a graph and extends to the x,y location is readily visualized. A two dimensional geometry can also be defined in other ways including, for example, a radius and angle notation. While two dimensional geometries are interesting and useful, a spatial database may handle objects that are represented by a feature vector having more than two features and thus more than two dimensions.

A feature vector is an n-dimensional vector of numerical features that represent an object, in this case a metadata object. Non-numerical data may be converted (e.g., hashed) to a numerical value during feature construction. A feature vector may be similar to a vector associated with an explanatory variable used in a statistical process like linear regression. The vector space associated with a set of vectors may be referred to as a feature space. Higher level features can be constructed from available features and added to a feature vector.

A spatial database can be queried with respect to relationships between objects in ways that are difficult, if even possible at all, for conventional table based SQL databases. The spatial database is used instead of the conventional relational database. In the spatial database, a metadata object is represented by a feature vector. The features for the vector include, but are not limited to: file inode number, file size, owner, permissions, and location of content on disk/tape.

By using the spatial database instead of a relational database, more efficient queries on various (e.g., any) combinations of features may be performed. For example, a query like "find all files modified yesterday that are at least 1 GB and owned by Steve" may be performed. Queries like this may have been inefficient, if even possible at all, in a conventional relational database approach.

FIG. 4 illustrates a feature space 400 where the distance between items is defined. For example, the distance between a first vector associated with a first item and a second vector associated with a second item may be measured by angle α and the distance between the second vector and a third vector associated with a third item can be measured by β. The distance between items may describe, for example, the degree of similarity of the items. The items represented by the feature vectors may be, for example, inodes, inode objects, files, or other items. While the distance is illustrated being measured by angles, other distance measuring approaches may be applied. The feature space 400 may have been created by adding feature vectors to the feature space 400. The feature vectors may include features that are encoded from inode information (e.g., inode number, inode state).

Figure 5:
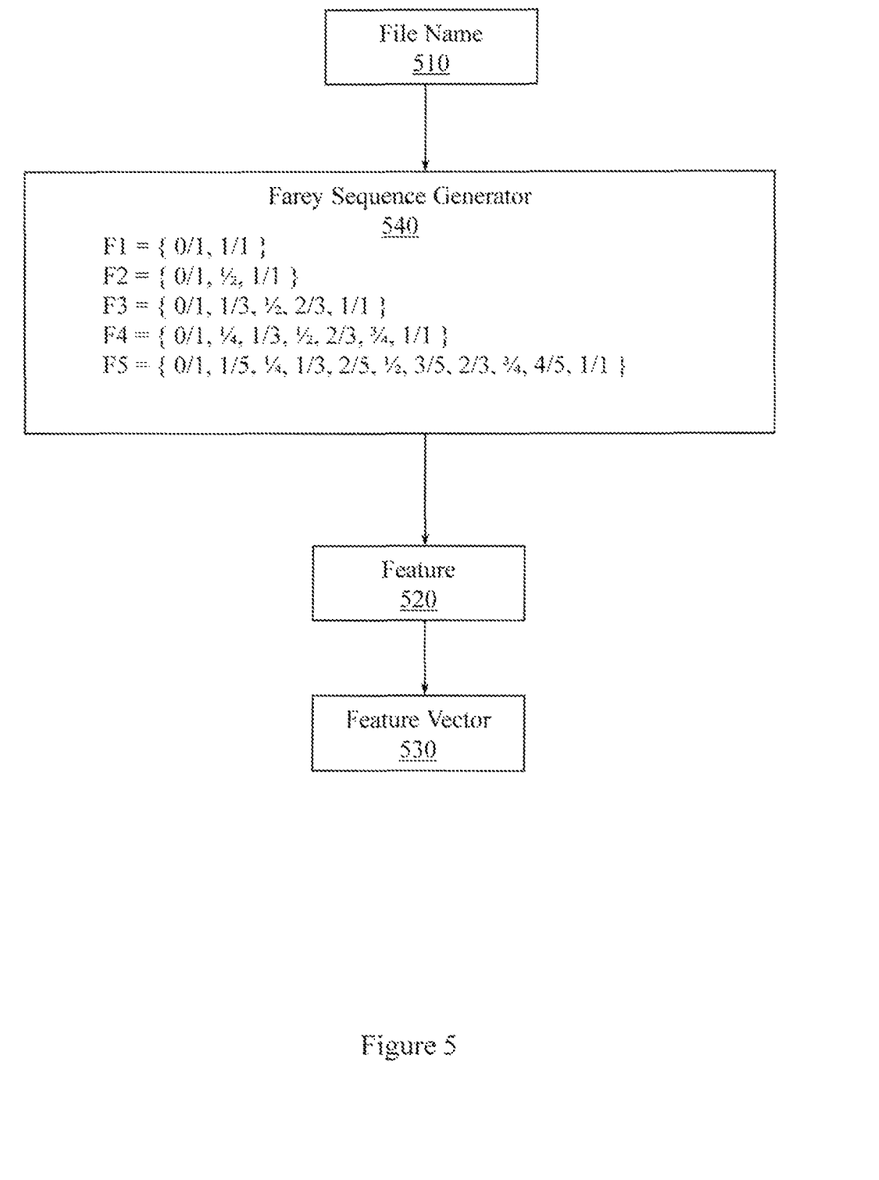
FIG. 5 illustrates using a Farey sequence in an example metadump spatial database system.

FIG. 5 illustrates using an example Farey sequence generator 540 to encode a file name 510 in the file system as a rational valued spatial dimension that is used as a feature 520 for the feature vector 530. A Farey sequence of order n is the sequence of completely reduced fractions between 0 and 1 that, when in lowest terms, have denominators less than or equal to n, arranged in order of increasing size. A Farey sequence starts at 0 and ends at 1. The middle term of a Farey sequence 1/2. Two neighboring Farey fractions are called a Farey pair. By way of illustration, the Farey sequences of order 1 to 5 are:

F1={0/1, 1/1}
F2={0/1, 1/2, 1/1}
F3={0/1, 1/3, 1/2, 2/3, 1/1}
F4={0/1, 1/4, 1/3, 1/2, 2/3, 3/4, 1/1}
F5={0/1, 1/5, 1/4, 1/3, 2/5, 1/2, 3/5, 2/3, 3/4, 4/5, 1/1}

Using a Farey sequence and assigning an inode to an interval in the sequence based on a file name or hash of a file name allows queries for membership in a directory tree and ancestry in ways that may be difficult, if even possible at all, in a relational database. The query is made possible by encoding the file name or directory path using the sequence to produce a feature for a feature vector. The ancestry of an inode may then be determined by querying on the Farey sequence feature. Descendants of a given inode may be found by identifying inodes having a Farey sequence in a defined interval.

The spatial database for the metadump is a spatially indexed metadata database. This facilitates supporting event notification. Users often manage their network file system content with an external content management system. Users may wish to have an application programming interface (API) by which they can efficiently query the file system for changed content in order to keep their content management system current. Specific requirements for how queries will be structured may be unknown, thus example systems and methods may provide a query API that allows queries to be built using different combinations of features.

The spatial database also facilitates providing a real time replication scheme. A real time replication scheme relies on the ability to maintain a mirror at a separate site with a copy of the metadata. The spatial database can be used to generate, in an ad-hoc fashion, the set of file system transactions needed to take a mirror from a first time point to a second time point. Being able to move between arbitrary points in time simplifies the synchronization of a mirror with a primary because it is not necessary to reconcile the target with the source, nor is it necessary for the source to 'store and forward' updates to the target. When using the spatial database approach, provided that the last transaction ID that the mirror received is known, the set of transactions needed to become current can be generated on the fly. This may be performed for an arbitrary number of mirrors efficiently, even if the different mirrors are updated to different time points.

The spatial database also facilitates providing a real time file system search. For example, a metadata spatial query API may be provided via a 'search' interface. The search interface allows users to find files based on some file properties without having to scan the entire file system to find the matches.

The spatial database also facilitates providing improved defragmentation. One challenge for file system defragmentation is indexing the metadata content by its location on disk in order to efficiently find candidates to defragment. The spatial query API facilitates performing these queries more efficiently. For example, using a spatial database with feature vectors, it may be more efficient to find fragmented files in some particular area of a physical disk. Recall that the proximity of one feature vector to another feature vector may reveal similarities between the objects represented by the feature vectors. When the proximity of the feature vectors depends on the location of the underlying files on a storage media, then groups of files that are located close together may be identified and defragmentation may proceed in or around locations associated with a group. This partial defragmentation may be more efficient than conventional defragmentation that requires scanning an entire media before proceeding.

The spatial database also facilitates providing snapshots because transaction identifiers are recorded and "obsolete" metadata is preserved. The history of metadata changes in the database facilitate producing a view of the file system at any point in time by using the obsolete metadata. The view may be produced without an explicit prior in time request for a snapshot. The spatial database can retroactively present a view of any time point.

The spatial database also facilitates providing incremental metadata backups because transaction identifiers are recorded and "obsolete" metadata is preserved. Producing an incremental backup of the metadata changes to the file system may involve querying from the file system and storing the result of the query in a file. The nature of the feature vectors in the spatial database support performing this querying and storing in an efficient manner so that the actions can be performed more frequently (e.g., once per second) than is possible in a conventional system. Being able to query and store with this frequency allows efficient high frequency backups to support more strict recovery point objectives (RPO) than are feasible or efficient in conventional systems.

In one embodiment, the spatial database uses rational number valued feature vectors. The performance and scalability of the spatial database is affected by the spatial heuristics for large rational valued feature vectors, the storage of large rational valued feature vector domains, feature normalization in a dynamic feature domain, application of copy-on-write (COW) semantics to a spatial database, and other issues.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 6:
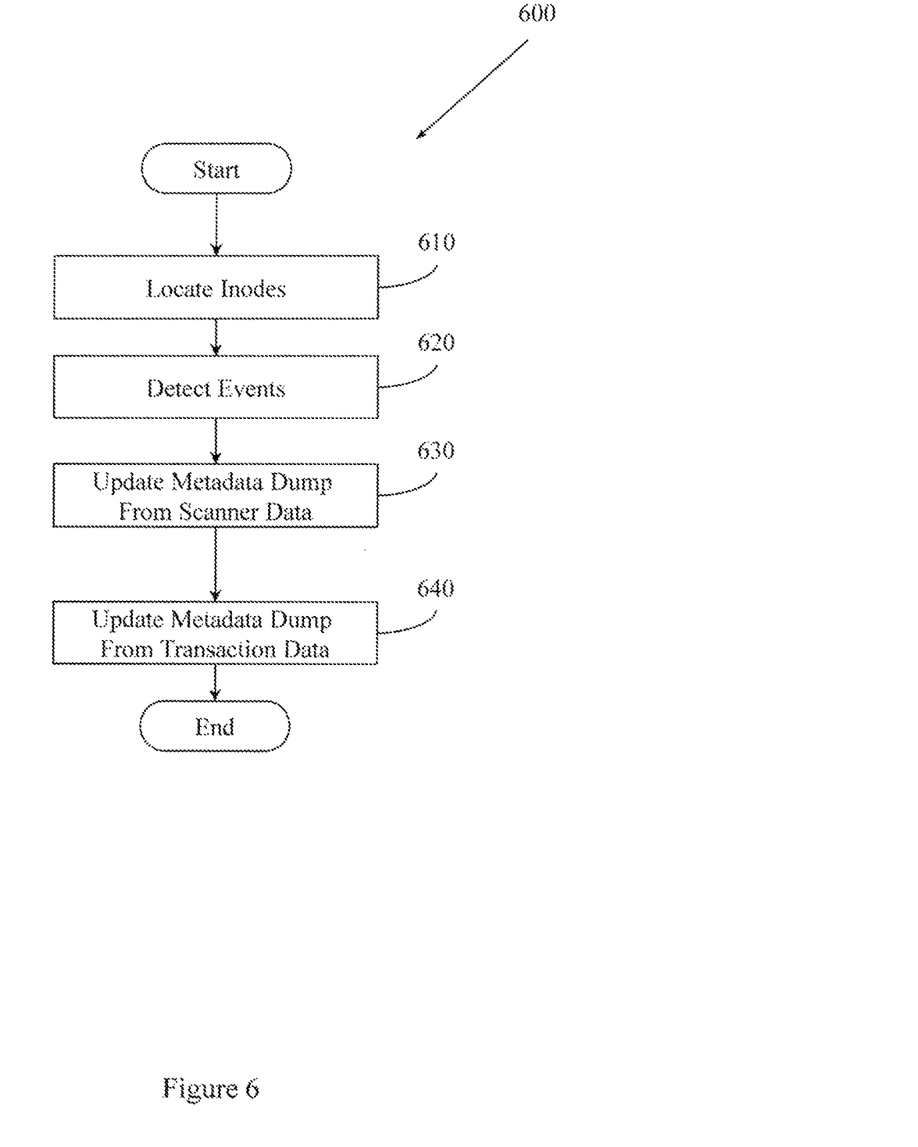
FIG. 6 illustrates an example method associated with a metadump spatial database system.

FIG. 6 illustrates a method 600 associated with preserving the structure and contents of metadata associated with an active file system. Method 600 may include, at 610, systematically locating inodes in the active file system and placing inbound scanner data associated with a located inode in a metadata update data store. The systematic approach may seek to touch every inode in a file system.

The active file system may store inodes and file system metadata in a btree(s). Thus the metadata dump data store may include a logical or physical inode data store and a logical or physical btree data store. The inode data store stores inode numbers and information from which the structure of the one or more btrees can be reconstructed. The btree data store stores data from which the contents of a btree(s) can be reconstructed. In one embodiment, systematically locating inodes includes locating every inode in the active file system. Systematically locating inodes may be performed using, for example, a depth-first tree walk, a breadth-first tree walk, a combination depth-first breadth-first tree walk, or other tree traversal approaches.

Unlike conventional systems where data may be stored as-is in a field in a record in a relational database table, the inbound scanner data is encoded into features associated with a feature vector associated with the located inode. The feature vector is part of a feature space stored in a spatial database. The features may include, for example, an inode number, a file size, a file owner, a file permission, a file location on a storage medium, an inode state, or other information. In one embodiment, the feature vector may use rational number values for features.

In one embodiment, the name of a file may be encoded into a feature in a feature vector. For example, the file name associated with a selected inode may be encoded using a Farey sequence. A feature for the feature vector associated with the name of the file associated with the selected inode may then be based, at least in part, on the Farey sequence. Queries based on the Farey sequence may seek data in and about the feature vectors that may be difficult, if even possible at all, to perform in a relational database. For example, a query that seeks file names that are "similar" to another file name may be made by determining the proximity of feature vectors on the Farey sequence feature.

Method 600 may also include, at 620, detecting an event that changes a changed inode in the active file system. The event may be detected while the systematic search of the file system is in progress. Inbound transaction data concerning the changed inode may be placed in the metadata update data store. Thus, method 600 gathers both systematic data and event driven data. The event driven data is stored as inbound transaction data that is encoded into features associated with a feature vector associated with the changed inode. A transaction identifier may also be stored or encoded. While the spatial database may store feature vectors that represent an inode, in one embodiment, information may also be stored about the transaction that caused the change. This information may be useful for undo, rewind, or other operations.

Method 600 may also include, at 630, selectively updating a metadata dump data store from the metadata update data store using the inbound scanner data. Recall that the scanner data was acquired using the systematic approach. Updating the metadata dump data store using the inbound scanner data may include manipulating feature vectors associated with located inodes.

Method 600 may also include, at 640, selectively updating the metadata dump data store from the metadata update data store using the inbound transaction data. Recall that the transaction data was acquired using the event driven approach. Updating the metadata dump data store using the inbound transaction data may also include manipulating feature vectors associated with changed inodes. The operation of method 600 produces a functional mirror of the metadata of an active file system without requiring down time in the active file system. The functional mirror is supported by a new and different data set that did not exist before the operation of method 600. The data set is encoded into features that are used to construct features that in turn define a feature space in a spatial database. The feature space can be queried efficiently in ways that may be inefficient, if even possible at all, in a conventional system.

In one embodiment, locating inodes, detecting events, and selectively updating the metadata dump data store operate at least partially in parallel to populate the metadata dump data store with metadata sufficient to restore the metadata of the active file system. Operating at least partially in parallel while allowing the active file system to remain active improves the efficiency of the computer running the file system and the computer running the spatial database since the applications can run continuously without having to be brought up and down. Efficiency is also improved because the systematic approach does not need to backtrack or start over when an event occurs. The event driven approach captures information for updating an inode whose information was acquired by the systematic approach before the event occurred.

Figure 7:
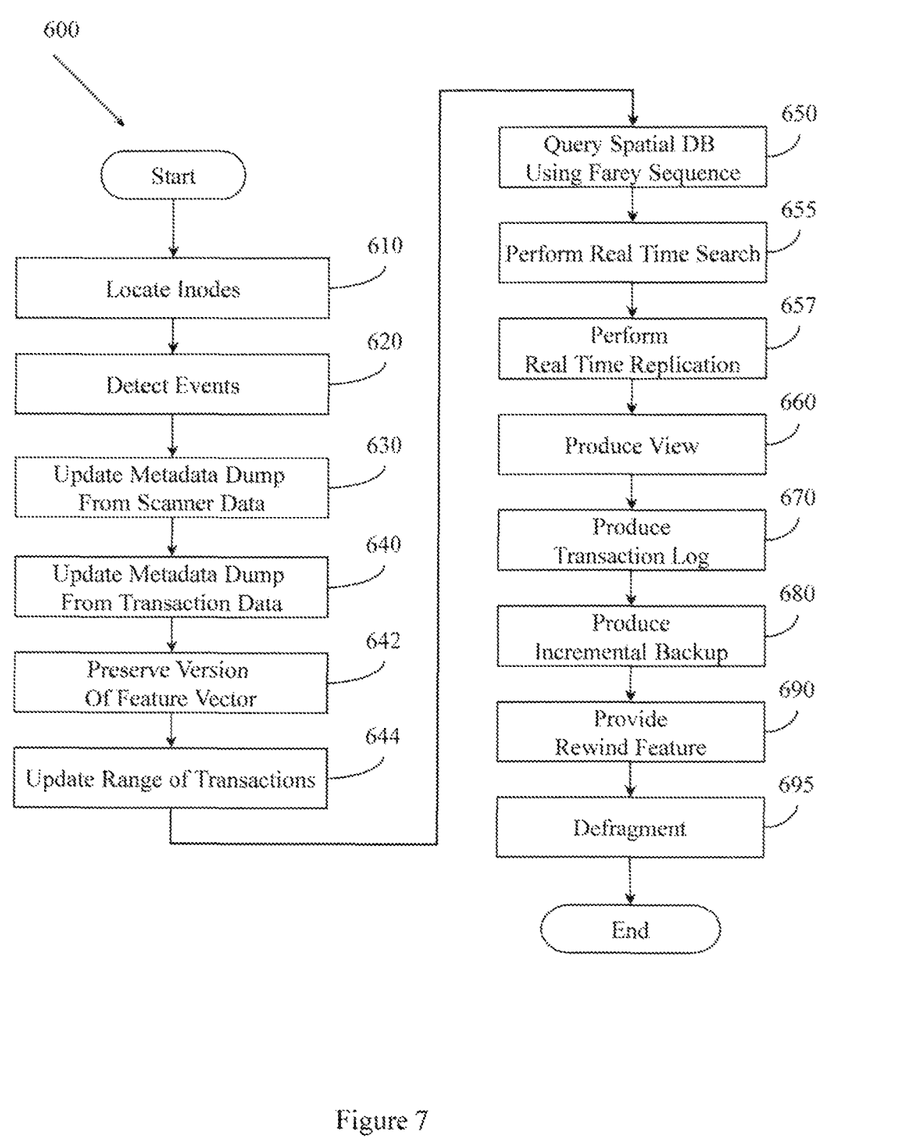
FIG. 7 illustrates an example method associated with a metadump spatial database system.

FIG. 7 illustrates another embodiment of method 600. In one embodiment, manipulating the feature vector associated with the changed inode includes recording a transaction identifier associated with an update to the changed inode.

The transaction identifier may be stored as a feature in the feature vector associated with the changed inode or may be stored in other ways.

In one embodiment of the spatial database, when new versions of metadata are received by the database from the file system, the old versions of the metadata are not removed. Rather, the transaction identification numbers over which each version of the metadata object existed are recorded. By doing so, the database can produce a view (e.g., snapshot) of the file system at any time point. Additionally, the database can produce a delta (e.g., incremental backup) containing the metadata changes from one point in time to another point in time. Additionally, the database can generate a log (e.g., event notifications) of user level file system changes that occurred over a time window.

Since transaction identifiers are being stored, this embodiment of method 600 may include, at 642, preserving a version of the feature vector associated with the changed inode or preserving other information associated with the changed inode. To take advantage of the stored transaction identifiers, method 600 may include, at 644, updating a range of transactions for which a feature vector or metadata object associated with a feature vector associated with the changed inode is valid. The range may be defined by a set of transaction identifiers. Having the transaction identifier and range of valid transactions available facilitates providing additional features including a rewind feature, a view feature, or an incremental backup feature.

This embodiment of method 600 includes, at 650, querying the spatial database using Farey sequence encoded information as a search term. Since the file names are encoded using the Farey sequence, spatial relationships between files may be discovered or exploited that may be difficult, if even possible at all, to find in a relational database. For example, ancestry and descendant information may be discovered based on a position within a bounded range of Farey values. Additionally, name similarity may be evaluated based on the proximity of feature vectors to a reference vector. The type of query provided may not be known ahead of time and thus some queries may be delivered through the API provided by the spatial database.

Method 600 also includes, at 655, performing a real time search of the active file system by querying spatially encoded information in the spatial database. The search may be performed without touching or stopping the actual file system since the metadata about the actual file system is stored in the spatial database. In one embodiment, the search may be made at the current point in time. In another embodiment, a search may be made for a previous point in time. The previous point in time search may be possible when transaction identifiers are recorded and when data that would be deleted by conventional systems is preserved.

A real time search without touching the actual file system is possible because the spatial database stores information sufficient to recreate the actual file system. Since information sufficient to recreate the actual file system is stored, method 600 may also include, at 657, performing real time replication of all or a portion of the actual file system. The replica may be provided for the current point in time or for a previous point in time. The replica can be produced without halting the actual file system.

With the transaction identifiers available, actions that are difficult, if even possible at all to perform with a conventional database may be undertaken. For example, method 600 may include, at 660, producing a view of the active file system at a specific point in time using data retrieved from the feature space. Membership in the view may be based, at least in part, on transaction identifiers stored in feature vectors in the spatial database. In one embodiment, the view may be a snapshot. The view may be provided without having to recreate any metadata objects or feature vectors because data that would conventionally be obsoleted may be preserved and may be retrieved using the recorded transaction identifiers.

Having the transaction identifiers and the conventionally obsolete transactions or feature vectors available may also facilitate, at 670, producing a log of transactions associated with the active file system. Like the view, membership in the log may be based, at least in part, on transaction identifiers stored in the spatial database.

Having the transaction identifiers and the conventionally obsolete transactions or feature vectors available may also facilitate, at 680, producing an incremental backup of the active file system. Membership in the incremental backup is based, at least in part, on transaction identifiers stored in the spatial database. Unlike conventional systems that may need to recreate metadata objects to provide an incremental backup, method 600 may identify a stored metadata object to provide using the transaction identifiers.

Having the transaction identifiers and the conventionally obsolete transactions or feature vectors available may also facilitate, at 690, providing a rewind feature for the active file system, providing an undo feature for the active file system, or providing an undelete feature for the active file system. The rewind feature, the undo feature and the undelete feature are based, at least in part, on transaction identifiers stored in the spatial database. Given a full transactional history of a file system, the file system can be rewound to a specified point in time. For example, a command could be run that performs an operation like 'let directory myfiles/abc be in the state it was yesterday at 11 am'. The spatial database can be used to reverse the delta from that time to the present to restore the file system to its state at that time.

Having the transaction identifiers and the conventionally obsolete transactions or feature vectors available may also facilitate, at 695, defragmenting a storage medium using spatially encoded information in the feature space in the spatial database. Defragmenting a computer-readable medium is a problem unique to computers and did not exist before the advent of computers. Defragmenting may proceed without scanning a disk to find file locations and holes because spatially encoded information identifies where a file is located on the storage medium. Not having to scan the media (e.g., disk) creates the technical effect of making the computer perform defragmentation more efficiently. The defragmenting may be complete or partial. Since the distance between feature vectors may provide information about the location where files are stored, defragmenting may be based, at least in part, on that distance. In one embodiment, defragmenting may be performed in parallel with multiple local defragmentation threads operating on different volumes defined in the feature space. In different examples the volumes may be pre-defined or may be selected based on the density of files found in a volume.

In one example, a method may be implemented as computer executable instructions. Thus, in one example, a computer-readable medium may store computer executable instructions that if executed by a machine (e.g., processor) cause the machine to perform method 600. While executable instructions associated with method 600 are described as being stored on a computer-readable medium, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium", as used herein, refers to a non-transitory medium that stores instructions and/or data. "Computer-readable storage medium" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 8:
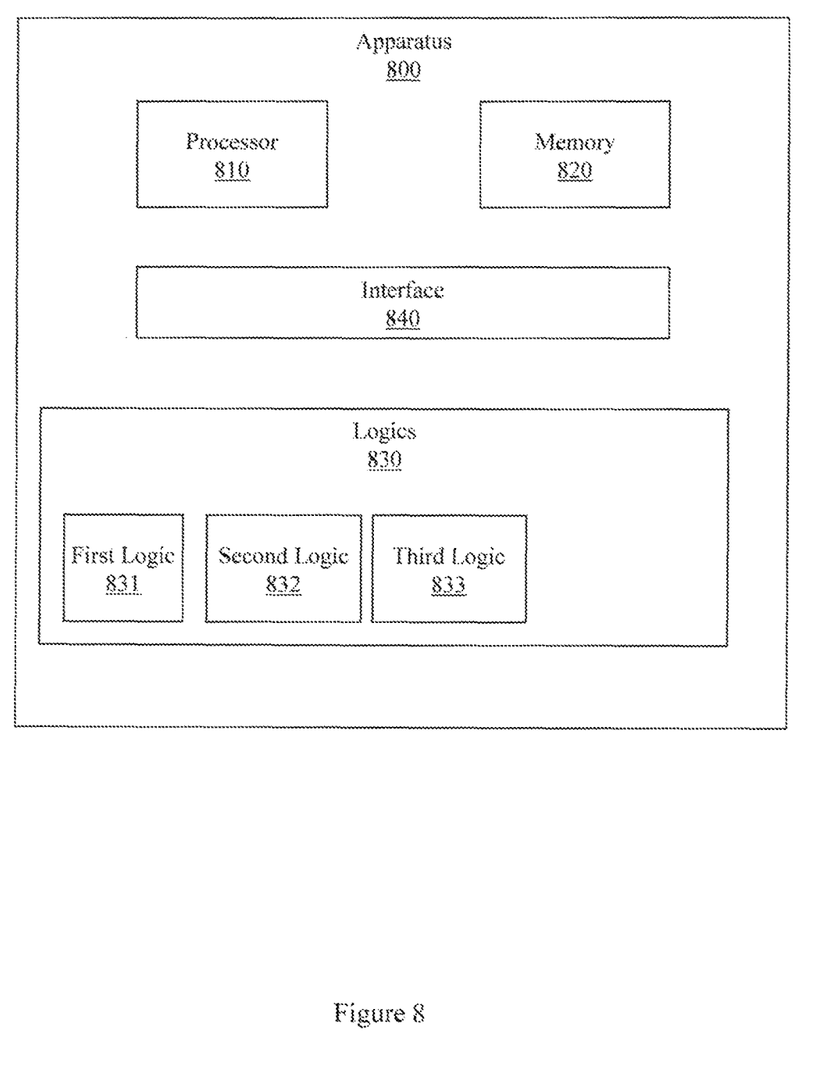
FIG. 8 illustrates an example apparatus associated with a metadump spatial database system.

FIG. 8 illustrates an apparatus 800 that includes a processor 810, a memory 820, and a set 830 of logics that is connected to the processor 810 and memory 820 by an interface 840. The memory 820 may store file system metadata state information.

The set 830 of logics may include a first logic 831 that instantiates a functional mirror of file system metadata for an active file system. Unlike a relational database where the functional mirror may be a table or plurality of tables, first logic 831 instantiates the functional mirror as a plurality of feature vectors that define a feature space in a spatial database. In one embodiment, the plurality may include a first set that acts as a pending data store and a second set that acts as a posted data store. Data may be moved from the pending data store to the posted data store.

The apparatus 800 may also include a second logic 832 that populates the functional mirror with feature vectors constructed from first data discovered using a systematic, system-wide, multi-threaded inbound crawler approach. For example, the names of files, permissions, access times, sizes, or other attributes of a file may be encoded into data that becomes a feature in a feature vector associated with the file. In one embodiment, the values stored in the feature vector may be real number values as opposed to integer number values. In one embodiment, a file name may be encoded using a Farey sequence.

The apparatus 800 may also include a third logic 833 that maintains the functional mirror using second data discovered using an event-driven inbound approach. Since the functional mirror is stored as a set of feature vectors that define a feature space in a spatial database, maintaining the functional mirror may include manipulating a feature vector in the feature space based, at least in part, on the second data. Manipulating the feature vector may include changing a value of a feature, adding a feature, removing a feature, or constructing a new higher dimension feature from a lower dimension feature or features.

To improve efficiency over conventional systems, the second logic 832 and the third logic 833 operate at least partially in parallel. For example, the second logic 832 may provide metadata structure information and metadata content information to the pending data store and the third logic 833 may detect file system transactions that change metadata in the active file system. The third logic 833 may produce a batch of transactions and present the batch of transactions to the pending data store. To further improve efficiency, the first logic 831, the second logic 832, and the third logic 833 operate while the active file system remains active.

Figure 9:
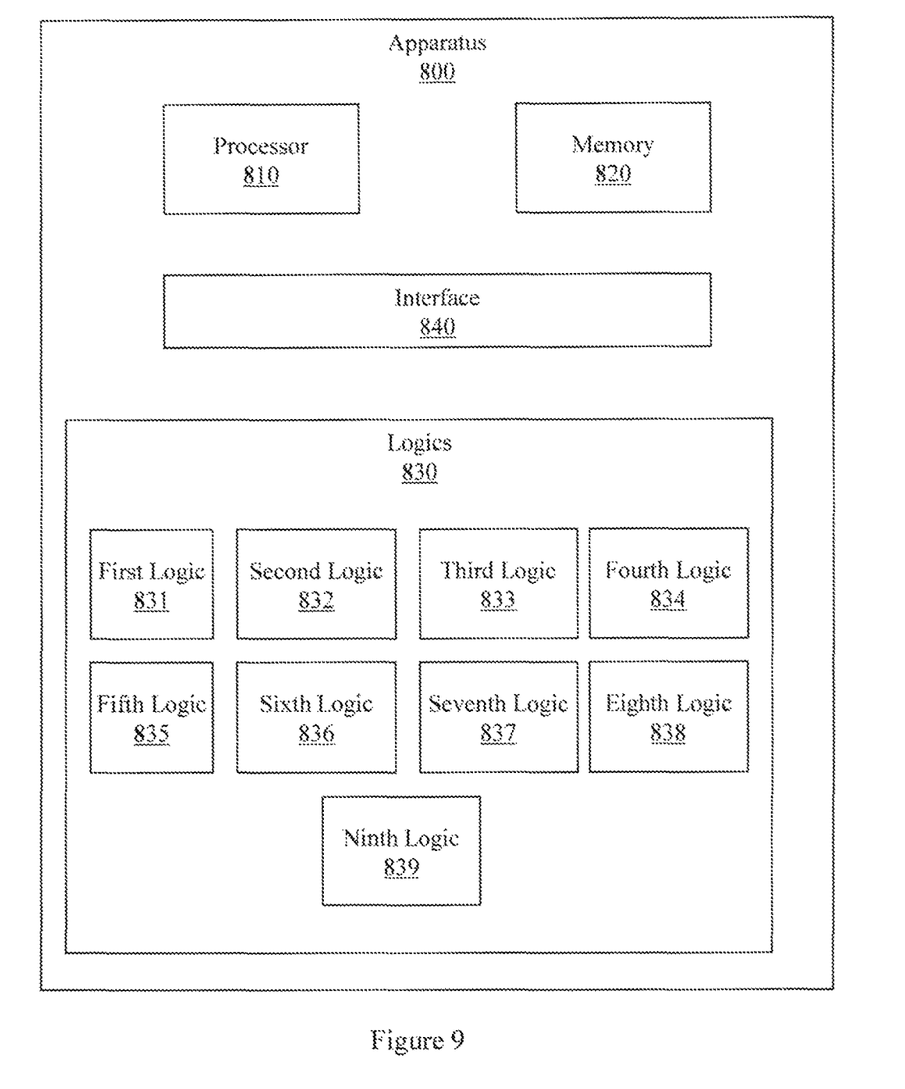
FIG. 9 illustrates an example apparatus associated with a file system metadata spatial database system.

FIG. 9 illustrates another embodiment of apparatus 800. This embodiment of apparatus 800 also includes a fourth logic 834 that restores the file system metadata from the functional mirror using both a systematic, system-wide, multi-threaded outbound crawler approach and an event-driven outbound approach. The systematic approach may crawl through the entire functional mirror to find data for each and every inode and file in the active file system that is being recreated. The event-driven approach may detect events and provide just-in-time or up-to-date data that can supplement or correct data found earlier by the systematic approach.

This embodiment of apparatus 800 also includes a fifth logic 835 that performs inode maintenance, inode conversion, or inode defragmentation while the active file system remains active. Conventionally, an inode maintenance or manipulation may have required the active file system to shut down while the inode space was updated. Since the functional mirror exists, the inode maintenance can be done more efficiently while the active file system remains active. When the inode maintenance is complete the new inode space may be quickly transferred with minimal or reduced downtime for the active file system.

This embodiment of apparatus 800 also includes a sixth logic 836 that provides an application programming interface (API) that accepts ad hoc queries on one or more features of a set of feature vectors. The features that make up the feature vectors may change over time. Also, the information that a user wants to retrieve from a functional mirror may change over time. Therefore, the API accepts queries that were not pre-defined.

This embodiment of apparatus 800 also includes a seventh logic 837 that provides a data movement policy that controls the spatial database to query the active file system for a specific file or a specific piece of metadata. A storage manager associated with a network file system may be considered to be a content management system. The storage manager may maintain its own database of the file system content, and may synchronize that content in real time via events sent by the file system. If an event is lost, then conventionally a full file system scan must be performed to rebuild the database. Using the spatial database, a storage manager may not need to perform the full file system scan but instead could query for a file that it should store, and then store the file returned by the query. When using the spatial database, the storage manager would not need to track state, and would not need to perform a reconciliation. In this scenario, the properties of the files that are pertinent to the data movement policy do not need to be known a priori, which allows a more flexible kind of ad-hoc data movement.

This embodiment of apparatus 800 also includes an eighth logic 838 that provides a real-time replica of the active file system at a specified point in time. The real-time replica may be built from the spatial database without touching the active file system. Since transaction identifiers and out-of-date data are preserved, the real-time replica may be provided for the current point in time or for previous points in time. Since conventional systems may not preserve transaction identifiers or out-of-date data, this functionality has not been conventionally provided.

This embodiment of apparatus 800 also includes a ninth logic 839 that performs defragmentation of a storage media based, at least in part, on file location information stored in feature vectors in the spatial database. In one embodiment, the defragmentation may be performed in parallel using a plurality of threads. A member of the plurality of threads defragments a portion of a storage media associated with a sub-volume of the feature space. The sub-volume may be pre-defined or may be selected based, at least in part, on a density of files located in the sub-volume. For example, a portion of a storage media that has very few files may not achieve improved performance from defragmentation. However, a portion of a storage media that has more than a threshold number of files may exhibit improved performance when defragmented. Conventionally, defragmentation may have been an all or nothing affair: either all the media was defragmented or none of the media was defragmented. Being able to identify files that are located within a threshold distance of each other on a storage media may facilitate defragmenting a subset of the media.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method for preserving the structure and contents of metadata associated with an active file system, the method comprising:
systematically locating inodes in the active file system and placing inbound scanner data associated with a located inode in a metadata update data store, where the inbound scanner data is encoded into one or more features associated with a feature vector associated with the located inode;
detecting an event that changes a changed inode in the active file system and placing in the metadata update data store inbound transaction data concerning the changed inode, where the inbound transaction data is encoded into one or more features associated with a feature vector associated with the changed inode;
selectively updating a metadata dump data store from the metadata update data store using the inbound scanner data, where the metadata dump data store is stored in a spatial database, where updating the metadata dump data store comprises manipulating the feature vector associated with the located inode; and selectively updating the metadata dump data store from the metadata update data store using the inbound transaction data, where updating the metadata dump data store comprises manipulating the feature vector associated with the changed inode using the inbound transaction data, where locating inodes, detecting events, and selectively updating the metadata dump data store operate at least partially in parallel to populate the metadata dump data store with metadata sufficient to restore the metadata of the active file system.

2. The computer-readable medium of claim 1, where the one or more features comprise at least one of an inode number, a file size, a file owner, a file permission, a file location on a storage medium, or an inode state.

3. The computer-readable medium of claim 1, where a member of the one or more features is encoded as a rational number value.

4. The computer-readable medium of claim 1, the method comprising:
encoding, using a Farey sequence, a file name associated with a selected inode, and
producing a feature for a feature vector associated with the selected inode based, at least in part, on the Farey sequence.

5. The computer-readable medium of claim 3, the method comprising querying the spatial database using Farey sequence encoded information as an index.

6. The computer-readable medium of claim 1, where manipulating the feature vector associated with the changed inode comprises recording, in the feature vector associated with the changed inode, a transaction identifier associated with an update to the changed inode.

7. The computer-readable medium of claim 6, the method comprising:
at least one of preserving a version of the feature vector associated with the changed inode or preserving an object associated with the changed inode, and
updating a range of transactions for which a metadata object associated with the feature vector associated with the changed inode is valid, where the range is defined by a set of transaction identifiers.

8. The computer-readable medium of claim 7, the method comprising producing a view of the active file system from the feature space, where membership in the view is based, at least in part, on transaction identifiers stored in the spatial database.

9. The computer-readable medium of claim 8, where the view is a snapshot.

10. The computer-readable medium of claim 7, the method comprising producing a log of transactions associated with the active file system, where membership in the log is based, at least in part, on transaction identifiers stored in the spatial database.

11. The computer-readable medium of claim 7, the method comprising producing an incremental backup of the active file system, where membership in the incremental backup is based, at least in part, on transaction identifiers stored in the spatial database.

12. The computer-readable medium of claim 7, the method comprising at least one of providing a rewind feature for the active file system, providing an undo feature for the active file system, or providing an undelete feature for the active file system, where the rewind feature, the undo feature and the undelete feature are based, at least in part, on transaction identifiers stored in the spatial database.

13. The computer-readable medium of claim 7, the method comprising providing a real time replication feature for the active file system, where the real time replication feature is configured to build a real time replica for a specified point in time.

14. The computer-readable medium of claim 1, the method comprising performing defragmentation of a storage medium using spatially encoded information in the spatial database, where the spatially encoded information identifies where a file is located on the storage medium.

15. The computer-readable medium of claim 14, where the defragmentation is performed in parallel using a plurality of threads, where a member of the plurality of threads defragments a portion of a storage media associated with a sub-volume of the feature space.

16. The computer-readable medium of claim 15, where the sub-volume is pre-defined.

17. The computer-readable medium of claim 15, where the sub-volume is selected based, at least in part, on a density of files located in the sub-volume.

18. The computer-readable medium of claim 7, the method comprising producing a real time replica of the active file system at a selected point in time using transaction identifiers stored in the spatial database and spatially encoded information in the spatial database.

19. The computer-readable medium of claim 1, the method comprising performing a real time search of the active file system at a selected point in time by querying spatially encoded information in the spatial database.

20. The non-transitory computer-readable medium of claim 1, where systematically locating inodes comprises locating every inode in the active file system.

21. The non-transitory computer-readable medium of claim 1, where systematically locating inodes comprises at least one of locating inodes in the active file system according to a depth-first tree walk, a breadth-first tree walk, or a combination depth-first breadth-first tree walk.

22. The non-transitory computer-readable medium of claim 1, where the active file system stores inodes and file system metadata in one or more btrees, and where the method comprises establishing the metadata dump data store with an inode data store and a btree data store, where the inode data store stores inode numbers and information from which the structure of the one or more btrees can be reconstructed, and where the btree data store stores data from which the contents of the one or more btrees can be reconstructed.

23. An apparatus, comprising:
a processor;
a memory that stores file system metadata state information;
a set of logics; and
an interface that connects the processor, the memory, and the set of logics;
the set of logics comprising:
a first logic that instantiates a functional mirror of file system metadata for an active file system, where the functional mirror is a plurality of feature vectors that define a feature space in a spatial database, the plurality including a first set that acts as a pending data store and a second set that acts as a posted data store;
a second logic that populates the functional mirror with feature vectors constructed from first data discovered using a systematic, system-wide, multi-threaded inbound crawler approach; and a third logic that maintains the functional mirror using second data discovered using an event-driven inbound approach, where maintaining the functional mirror comprises manipulating a feature vector in the feature space based, at least in part, on the second data, where the second logic and third logic operate at least partially in parallel, where the apparatus selectively updates the posted data store from the pending data store, and where the first logic, the second logic, and the third logic operate while the active file system remains active.

24. The apparatus of claim 23, where the second logic provides metadata structure information and metadata content information to the pending data store and where the third logic detects file system transactions that change metadata in the active file system, produces a batch of transactions, and presents the batch of transactions to the pending data store.

25. The apparatus of claim 24, comprising:
a fourth logic that restores the file system metadata from the functional mirror using both a systematic, system-wide, multi-threaded outbound crawler approach and an event-driven outbound approach.

26. The apparatus of claim 25, comprising:
a fifth logic that performs at least one of inode maintenance, inode conversion, or inode defragmentation while the active file system remains active.

27. The apparatus of claim 23, comprising:
a sixth logic that provides an application programming interface that accepts an ad hoc query, where the ad hoc query seeks information on one or more features of the set of feature vectors.

28. The apparatus of claim 23, comprising:
a seventh logic that provides a data movement policy that controls the spatial database to query the active file system for at least one of a specific file or a specific piece of metadata and to update the spatial database with a result of the query of the active file system.

29. The apparatus of claim 23, comprising:
an eighth logic that provides a real-time replica of the active file system at a user-specified point in time, where the real-time replica is built from the spatial database without touching the active file system.

30. The apparatus of claim 23, comprising:
a ninth logic that performs defragmentation of a storage media based on file location information stored in the spatial database,
where the defragmentation is performed in parallel using a plurality of threads,
where a member of the plurality of threads defragments a portion of a storage media associated with a sub-volume of the feature space, and
where the sub-volume is pre-defined or where the sub-volume is selected based, at least in part, on a density of files located in the sub-volume.

31. A system, comprising:
means for preserving the structure and contents of metadata for a file system using a comprehensive inbound file system metadata investigator that manipulates feature vectors in a feature space;
means for maintaining the structure and contents of metadata for the file system using a file system transaction detector that manipulates feature vectors in the feature space; and
means for restoring the structure and contents of metadata for the file system using a comprehensive outbound file system metadata placer and an on-demand outbound file system metadata placer, where the comprehensive outbound file system metadata placer and the on-demand outbound file system metadata placer retrieve inode data from feature vectors in the feature space,
where the means for preserving, the means for maintaining, and the means for restoring operate at least partially in parallel, and
where the means for preserving and the means for maintaining first update a pending write data store and then control the pending write data store to preserve and maintain the structure and contents of metadata by selectively updating a posted data store.

* * * * *